US006871474B2

(12) United States Patent
Töpfer

(10) Patent No.: US 6,871,474 B2
(45) Date of Patent: Mar. 29, 2005

(54) PORTIONING DEVICE

(75) Inventor: Klaus Töpfer, Büttelborn (DE)

(73) Assignee: Poly-clip System GmbH & Co. KG (DE)

( * ) Notice: Subject to any disclaimer, the term of this patent is extended or adjusted under 35 U.S.C. 154(b) by 50 days.

(21) Appl. No.: 10/186,063

(22) Filed: Jun. 28, 2002

(65) Prior Publication Data
US 2003/0005664 A1 Jan. 9, 2003

(30) Foreign Application Priority Data
Jun. 30, 2001 (DE) .......................................... 101 31 807

(51) Int. Cl.[7] .............................................. B65B 51/04
(52) U.S. Cl. ...................................... 53/138.4; 53/576
(58) Field of Search ............................ 53/138.4, 138.3, 53/138.2, 575, 576, 417; 27/243.56, 243.57

(56) References Cited

U.S. PATENT DOCUMENTS

| 2,831,302 | A | * | 4/1958 | Jensen et al. ............... 53/138.4 |
| 3,237,290 | A | * | 3/1966 | Frank ....................... 29/243.57 |
| 3,380,226 | A | * | 4/1968 | Tracy ........................ 53/138.4 |
| 3,795,083 | A | * | 3/1974 | Wells ........................ 53/138.4 |
| 3,852,939 | A | * | 12/1974 | Yoshi ........................ 53/138.4 |
| 4,001,926 | A | * | 1/1977 | Velarde .................... 29/243.56 |
| 4,571,805 | A | * | 2/1986 | Niedecker ................ 29/243.56 |
| 4,766,713 | A | * | 8/1988 | Evans ........................ 53/138.2 |
| 4,939,885 | A | * | 7/1990 | Steinke ...................... 53/138.4 |
| 5,067,313 | A | * | 11/1991 | Evans .......................... 53/576 |
| 5,077,955 | A | * | 1/1992 | Evans ........................ 53/138.4 |
| 5,586,424 | A | * | 12/1996 | Chen et al. ................ 53/138.2 |
| 6,484,474 | B1 | * | 11/2002 | Knieriem ................... 53/138.4 |

FOREIGN PATENT DOCUMENTS

| DE | 24 29 309 A1 | 6/1975 |
| DE | 195 19 591 A1 | 12/1995 |

OTHER PUBLICATIONS

English language translation of claims—DE 195 19 591 filed Dec. 7, 1995.

* cited by examiner

Primary Examiner—Louis Huynh
(74) Attorney, Agent, or Firm—Hahn Loeser & Parks, LLP; Robert J. Clark

(57) ABSTRACT

A device for partitioning portion packages from a filled casing string by constricting it and applying at least one closing clip onto the casing string, which consists of two sets of displacement elements and a clipping apparatus consisting of two interacting elements that can move between the displacement element sets in mutually opposite directions, wherein the displacement elements and the elements of the closing apparatus are connected via rotating joints to the cranks driven in the same direction and are guided via a joint guiding element, which is seated in a swiveling manner about the (virtual) casing axis on a carrier holding also the cranks.

16 Claims, 13 Drawing Sheets

PORTIONING DEVICE

BACKGROUND OF THE INVENTION

Figure 1A:
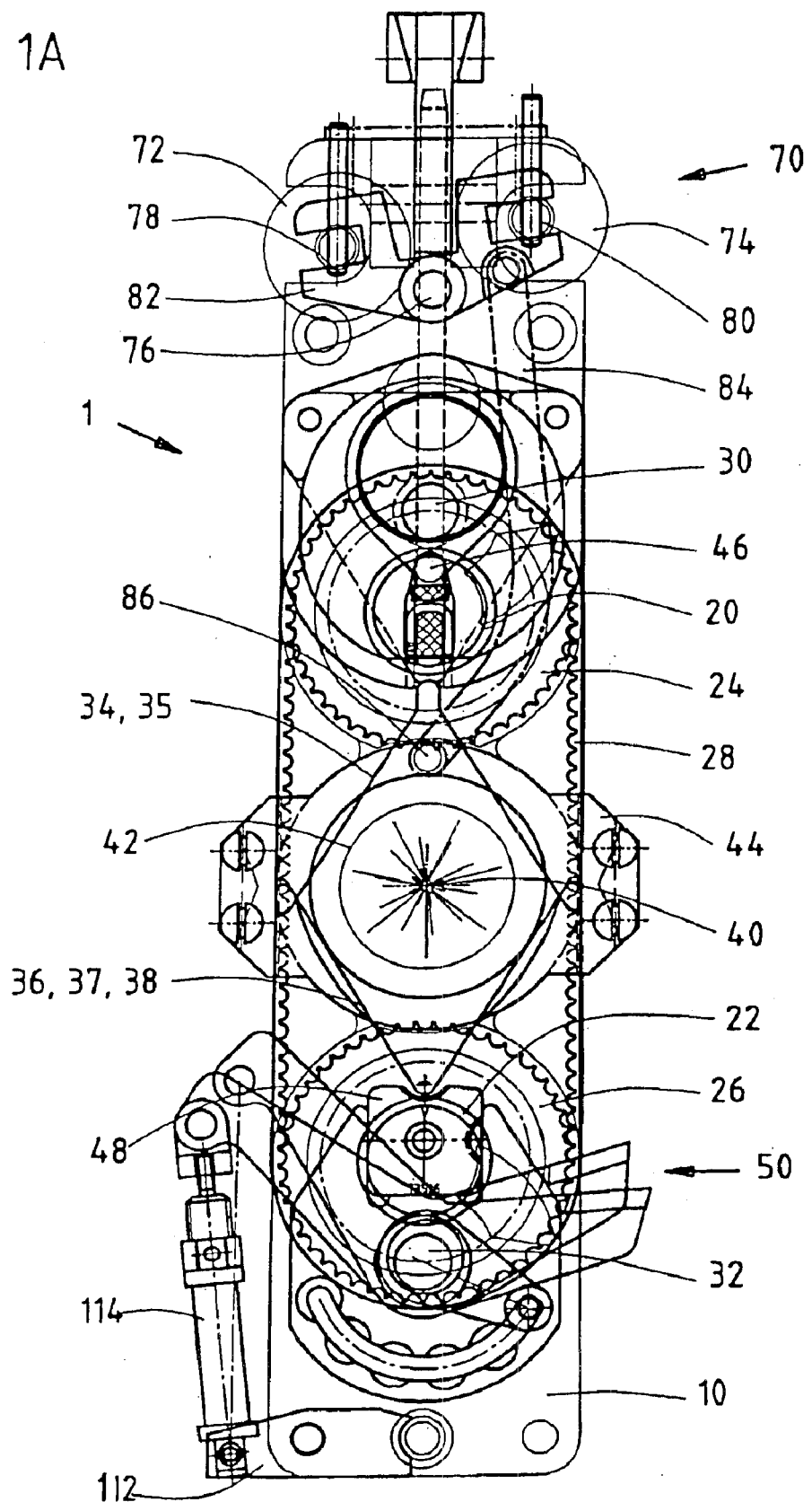

The invention relates to a device for partitioning portion packages of a dividable stuffing material in a flexible tubular casing by constricting the filled casing and applying at least one closing clip on the casing tress. The casing tress is formed through axial displacement of the stuffing material, with two sets of overlapping displacement elements, which are symmetrical with respect to the axis of the casing, are displaceable in mutually opposite directions, and have substantially triangular notches facing each other. A clipping apparatus consisting of two elements interacting with each other and displaceable in mutually opposite directions is positioned between the displacement element sets. One displacement element of each set as well as the one element of the clipping apparatus are moved by a first crank and the other displacement elements of each set as well as the other element of the clipping apparatus are moved by a second crank. The radii of the cranks are equal and their axes of rotation have the same distance to the casing axis with which they are arranged parallel in a joint plane. The cranks can be rotated about their axes of rotation synchronously from casing axis removed opening positions into casing axis adjacent closing position of the displacement elements and the elements of the clipping apparatus and furthermore can be rotated again into the casing axis removed opening positions (operating cycle).

Such a device is known from DE 24 29 309 A1. It serves primarily the production of sausages with a stuffing material consisting of sausage filling, however any other paste-like stuffing material or organic and inorganic kind is possible as well. In general, it is arranged after a filling device, wherein the stuffing material is pressed through a filling tube into the packing casing that is pulled off its outer side. In an intermittently operating filling device, the partitioning and closing apparatus engages at the completion of a filling operation. In the case of continuous filling, it engages with the filled packaging casing string. In both cases, the displacement elements form the casing tress, which marks the end of one portion and the beginning of the next; two closing clips placed onto the same casing tress at a certain distance ensure that the closure is permanent. The casing tress can be separated between the two closing clips. The sausages are processed individually.

The above-addressed partitioning and clipping apparatus is driven by cranks that reach into cam slots with cam rollers, wherein the slots run crosswise to the advancing device in the displacement elements affecting the partitioning. The elements of the clipping apparatus are actuated in the same manner.

From DE 36 10 010 C2 we also know of a portioning device, where the longitudinal movement in mutually opposite directions of the displacement elements crosswise to the casing axis is guided by guide rods and is controlled by a cam disk revolving about the casing axis.

The portioning performance of such devices for partitioning and closing individual packages from a casing strand filled with the appropriate stuffing material is limited. This is mainly due to the complex control of the interacting, subsequently activated device elements as well as the inertia of the masses to be accelerated and slowed down during this process. Additionally, problems with the guiding accuracy of the cam drives as well as their wear arise.

SUMMARY OF THE INVENTION

The invention is supposed to resolve that. In a device of above-described design it consists of the fact that the displacement elements and the elements of the clipping apparatus are connected via rotating joints to the cranks driven in the same direction and are guided via a joint guiding element, which is seated in a swiveling manner about the (virtual) casing axis on a carrier holding also the cranks.

This way, the back and forth linear movement of the displacement elements and the elements of the clipping apparatus is superimposed by a back and forth swivel movement of the entire device, which thus performs a double motion during each operating cycle. These kinematics considerably reduce the back and forth moving masses and furthermore accelerate and delay a harmonic, sinusoidal progression. Due to the symmetry of the configuration and the drive to the casing axis (a line connecting the crank axes always cuts through the casing axis), substantially a balancing of masses and forces occurs during operation, which despite high speed leads to very quiet running of the device.

The invention utilizes the knowledge that due to the central symmetry of the filled tubular casing and the casing tress it is unimportant in which radial direction the displacement elements engage for the formation of the tubular tress and the elements of the clipping apparatus engage for placement of the closing clip. Due to the synchronous rotation of the cranks in the same direction, which drive the longitudinal movements of the displacement elements and the elements of the clipping apparatus towards the casing axis, they are pivoted in the same direction—about the quasi virtual casing axis; this occurs during the rotation out of the opening position into the closing position to the one side and during the return from the closing position to the opening position to the other side.

During operation of the device, the processes of the casing tress formation by the local constriction of the tubular casing and the displacement of the stuffing material located there as well as the closing process by moving the two elements of the clipping apparatus towards the casing tress, are superimposed on each other. This shortens the time that is required for portioning (partitioning and closing) considerably compared to the state of the art.

Closing elements can take on all kinds and shapes, including the tress welding process. Primarily however a clip closure is provided. Therefore the elements of the clipping apparatus preferably consist of a tappet device and a matrix for closing a clip, wherein a clip intake channel joins at a distance from the crank pin into a guide path of the clip in such a way that its outlet opening in the open position is aligned with the guide path and a clip can enter it. With the beginning of the subsequent operating cycle, the aligned relative position of the outlet opening is interrupted in relation to the guide path because the latter—as described above—pivots laterally. This closes the outlet opening, for example by component that laterally limits the guide path. A configuration in which the tappet device and/or its guide path of a clipping apparatus of the kind addressed here "picks up" the next clip from a magazine, whose outlet only has access temporarily to the tappet device guide path, is known from DE 199 53 694 A1, however within the framework of a different kinematic set-up.

A further development of the invention doubles the constricting and clipping apparatus such that two double sets of displacement elements and two clipping apparatuses are arranged next to each other and symmetrically to the center plane cutting through the axes of rotation of the cranks, wherein with the double sets two closing elements running in the same direction can be placed at a distance from each other onto the casing head. This way it is possible to sever the casing head connections of subsequent portions without eliminating their closure. This development is therefore preferably supplemented by a knife that is guided in the center plane, wherein this knife can be actuated selectively during the operating cycle in such a way that the knife severs the casing tress between the two closing elements immediately upon conclusion of the closing process.

This configuration can be such that the blade of the knife is incorporated at one end of a flat double lever that is bent at an obtuse angle and can pivot in the bent area about the assigned crank pin, while the other lever end is fastened on the carrier in a stationary manner via an adjusting device the length of which can be modified. This way the knife is carried along during every operating cycle and the setting of the adjusting device determines whether it will sever in the next closing position or not. In the latter case the knife blade glides just above the casing tress, while it severs it in the cutting position with a pulling cutting movement.

Further beneficial embodiments and further developments of the invention are also the object of dependent claims.

BRIEF DISCUSSION OF THE DRAWINGS

Figure 1B:
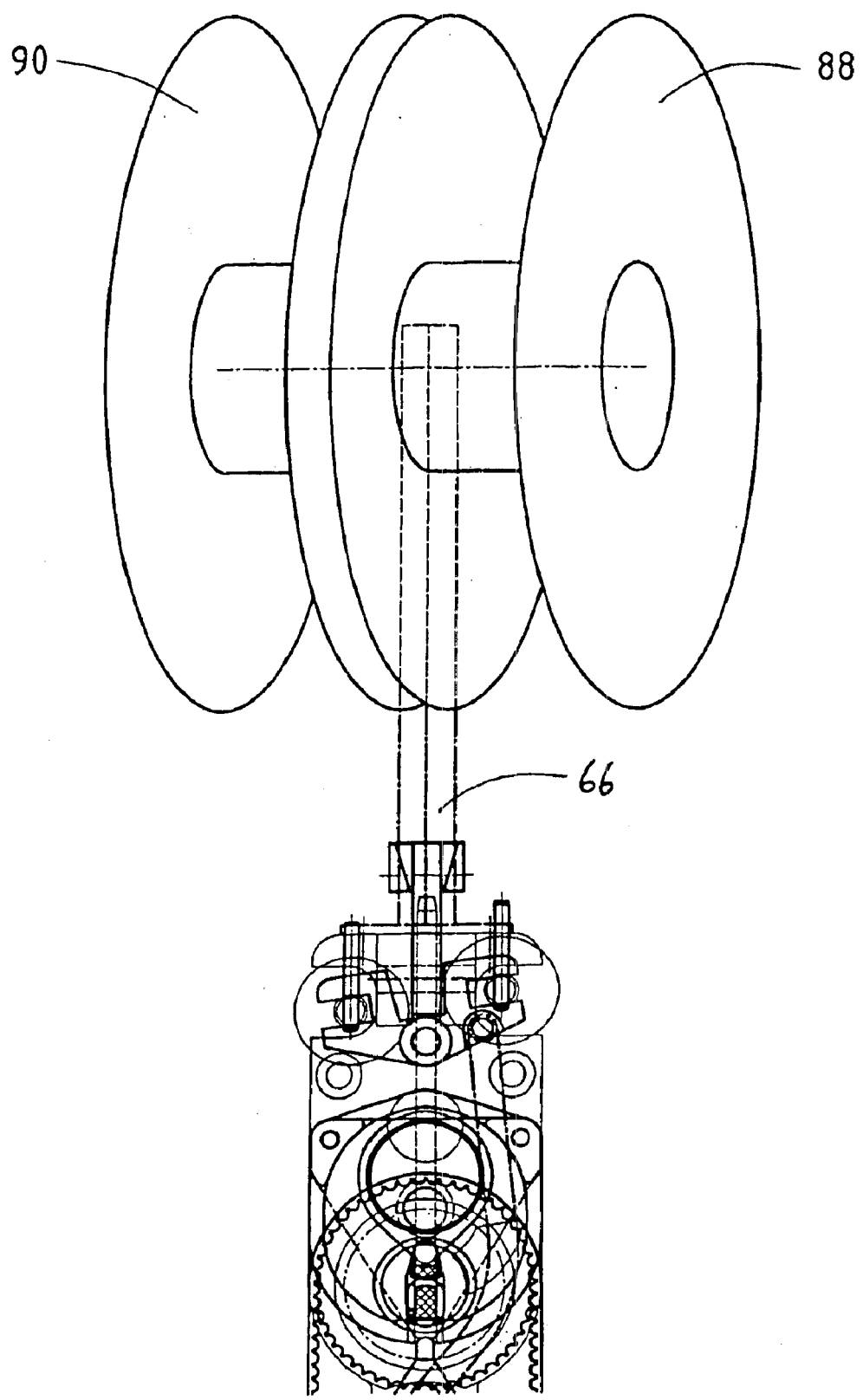
Figure 2A:
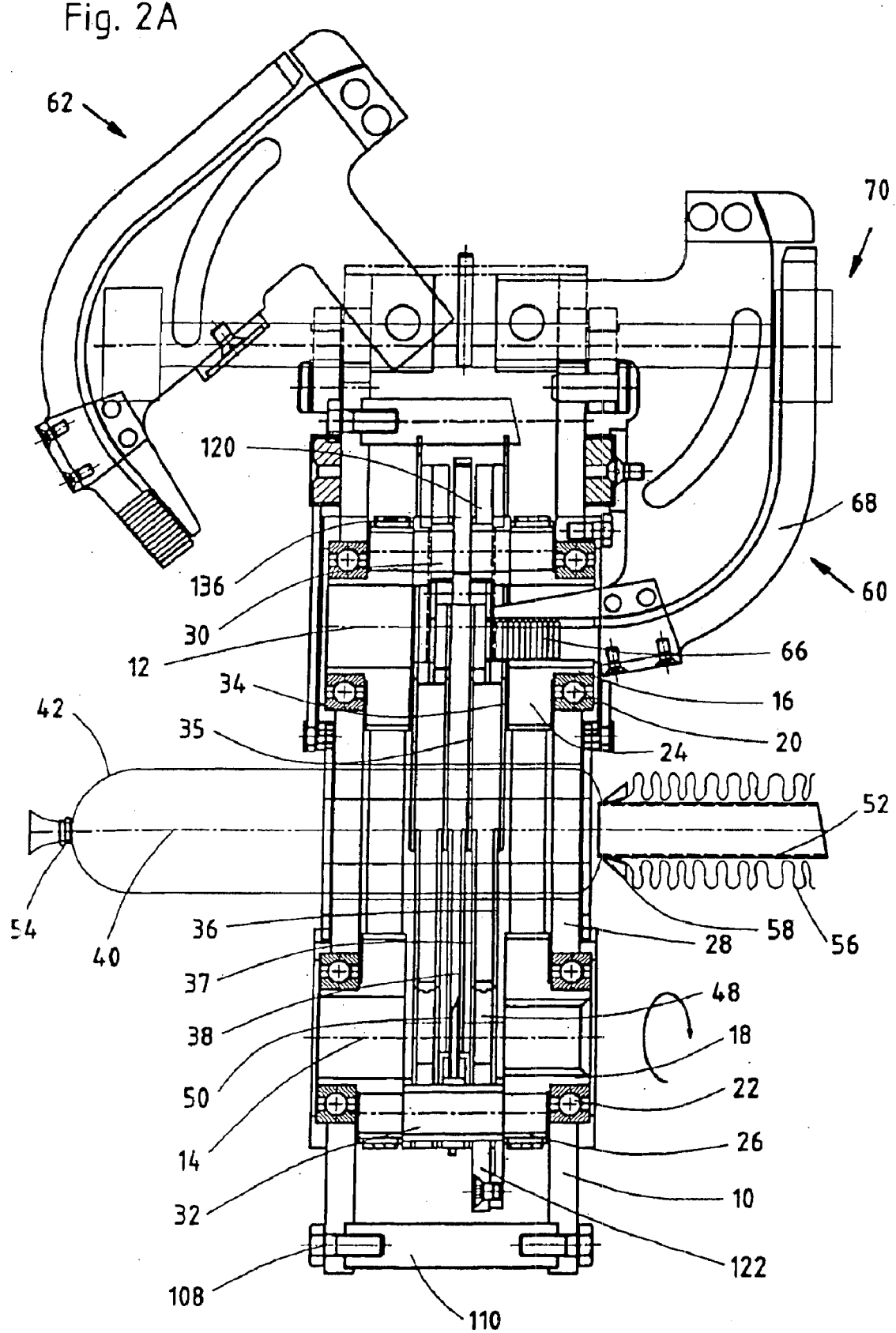
Figure 2B:
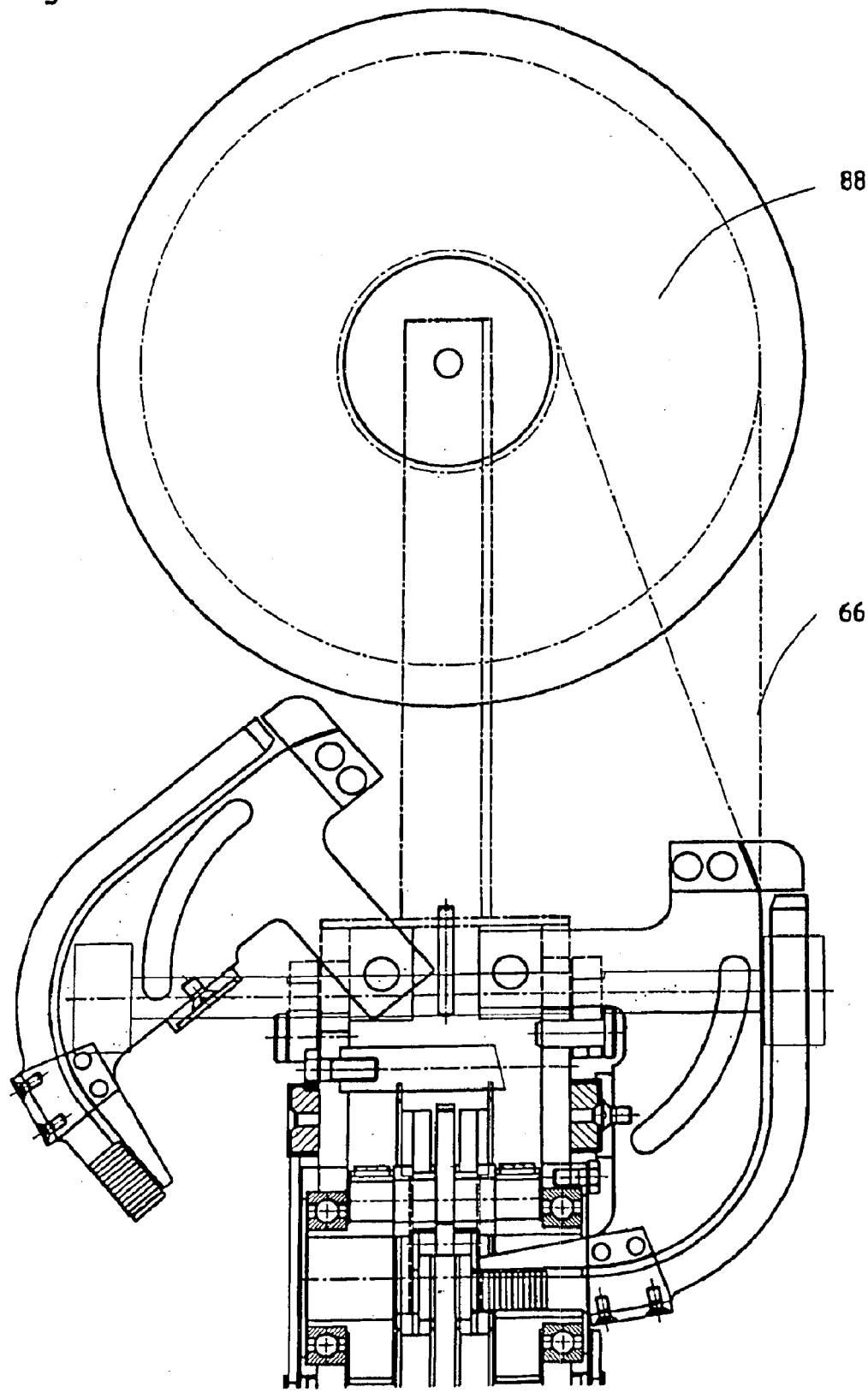
Figure 3:
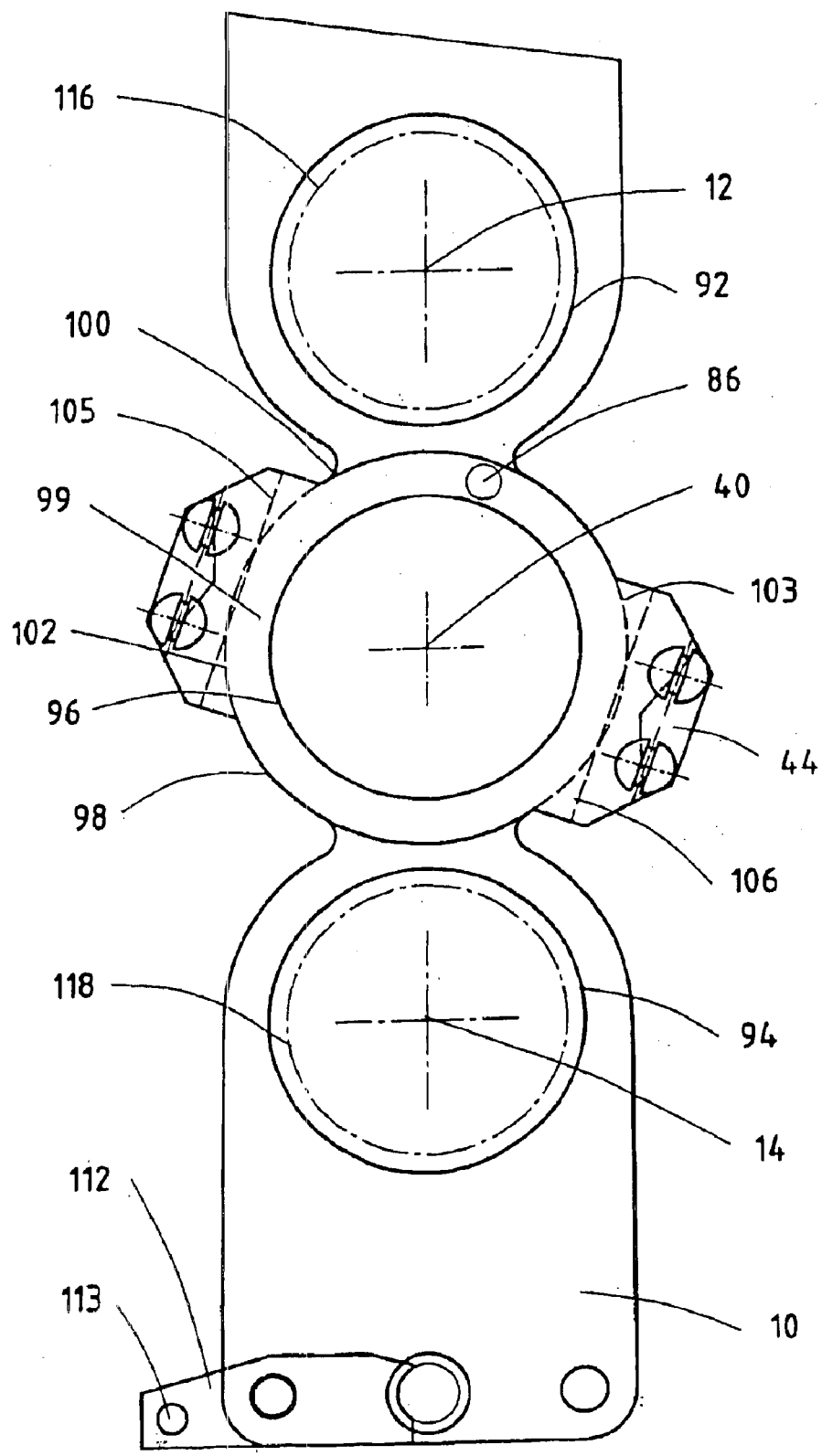
Figure 4:
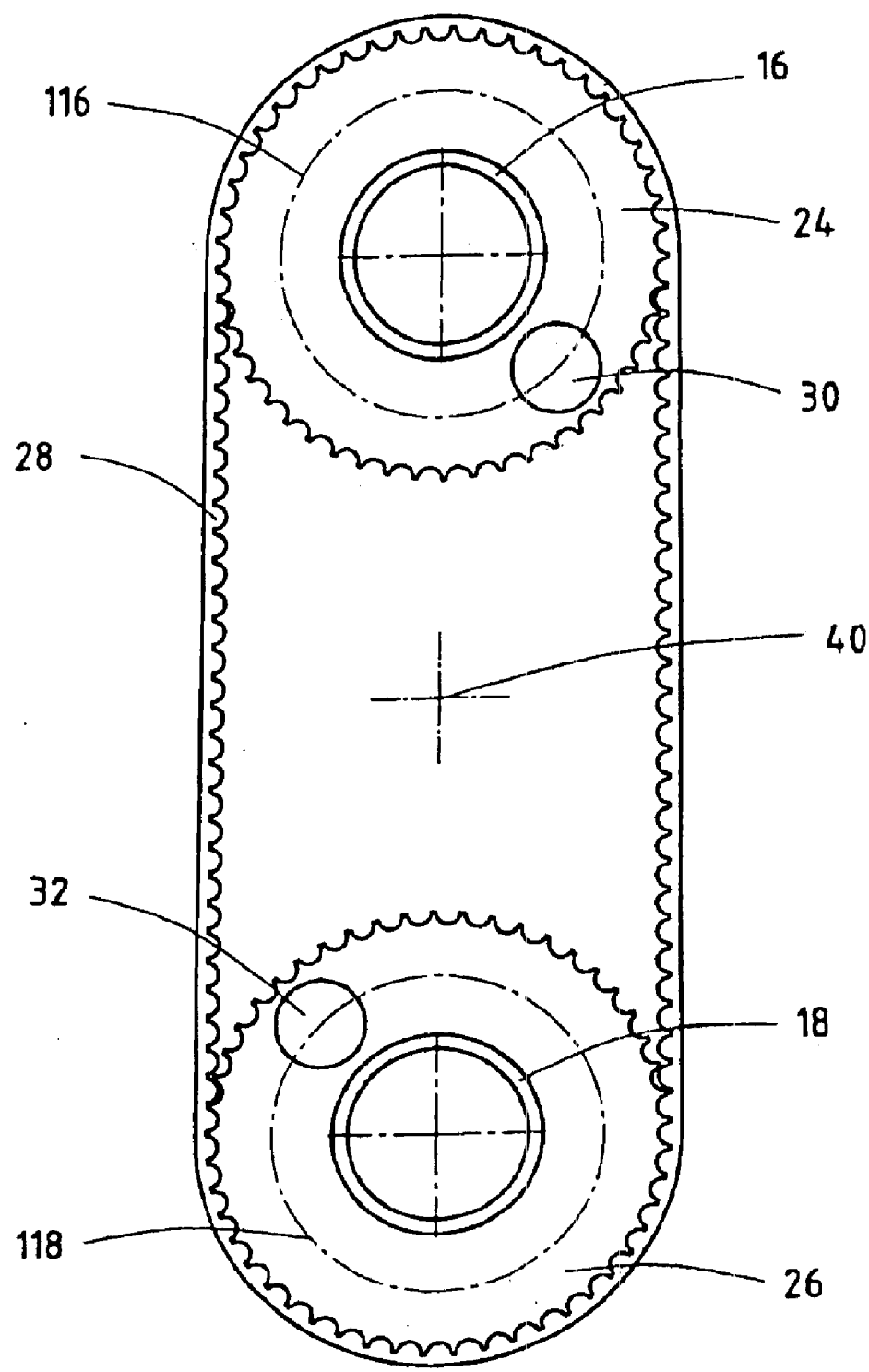
Figure 5:
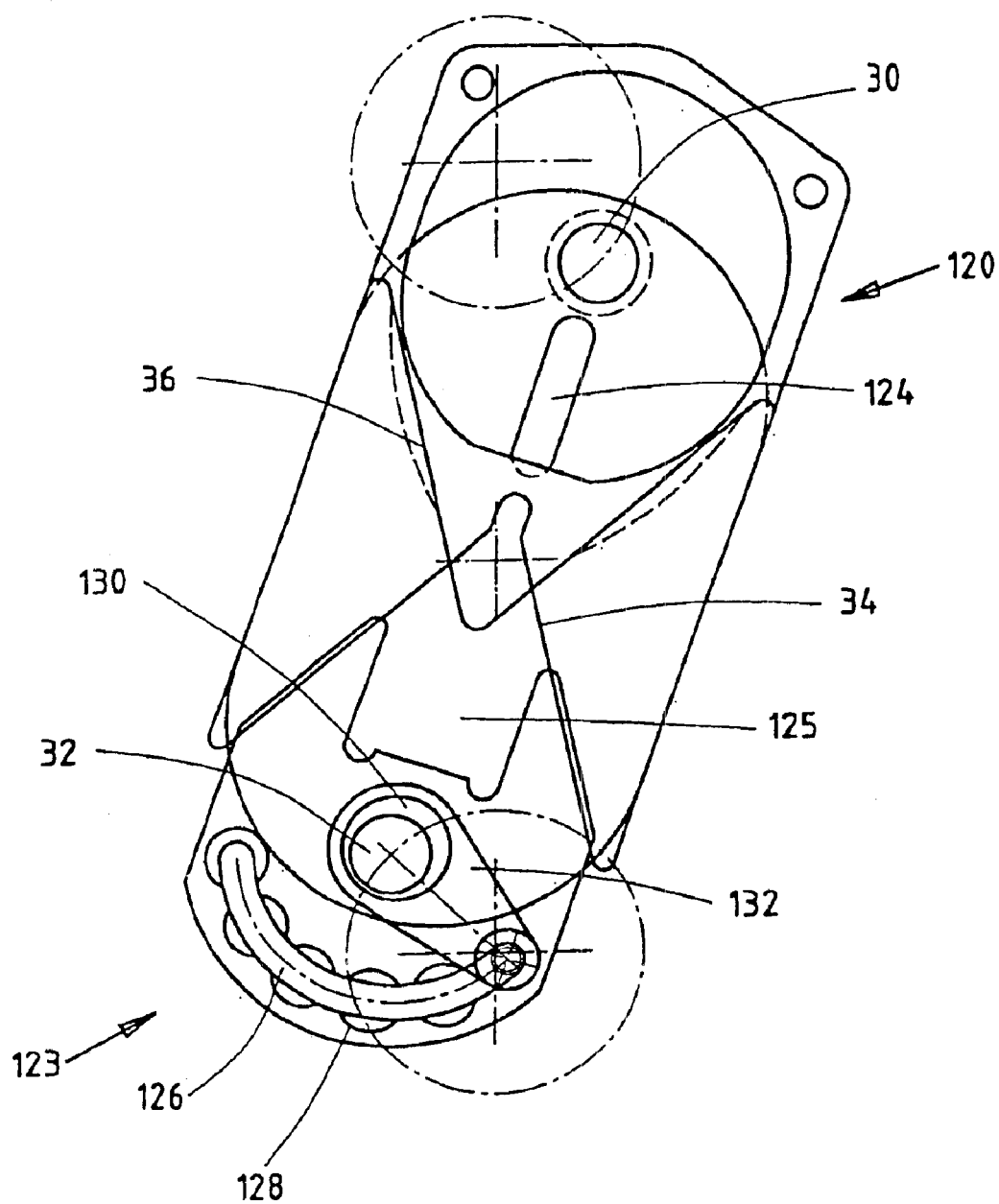
Figure 6:
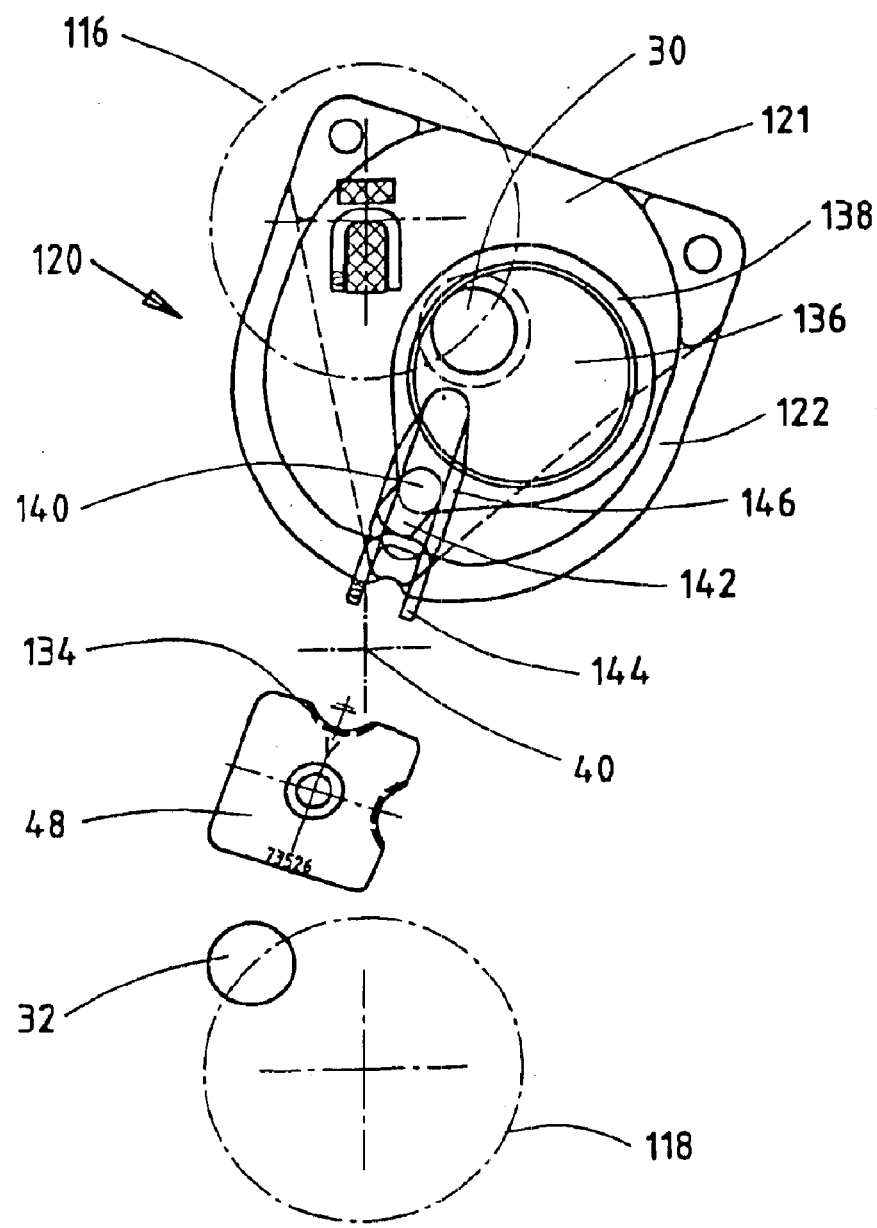
Figure 7:
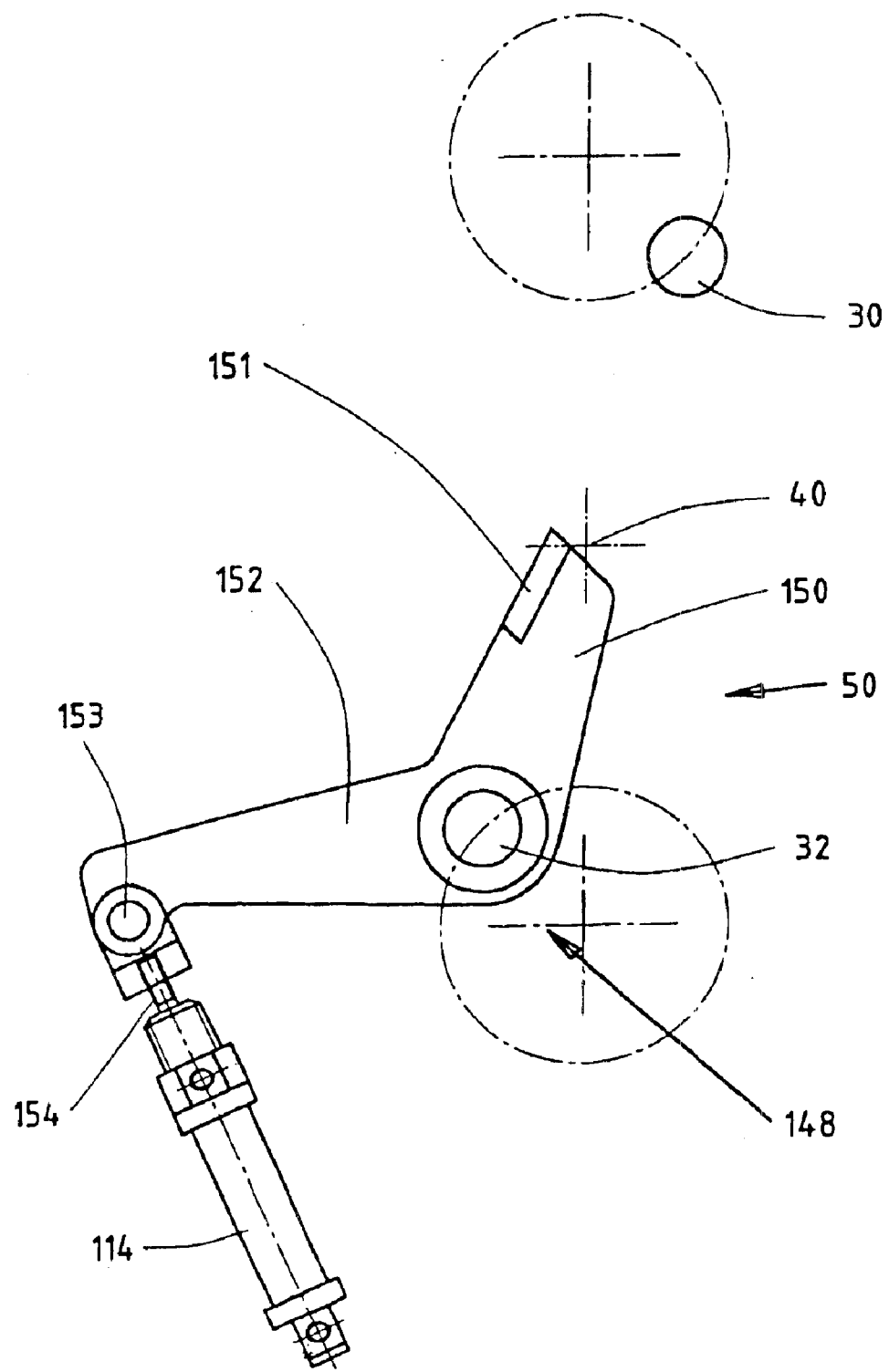
Figure 8A:
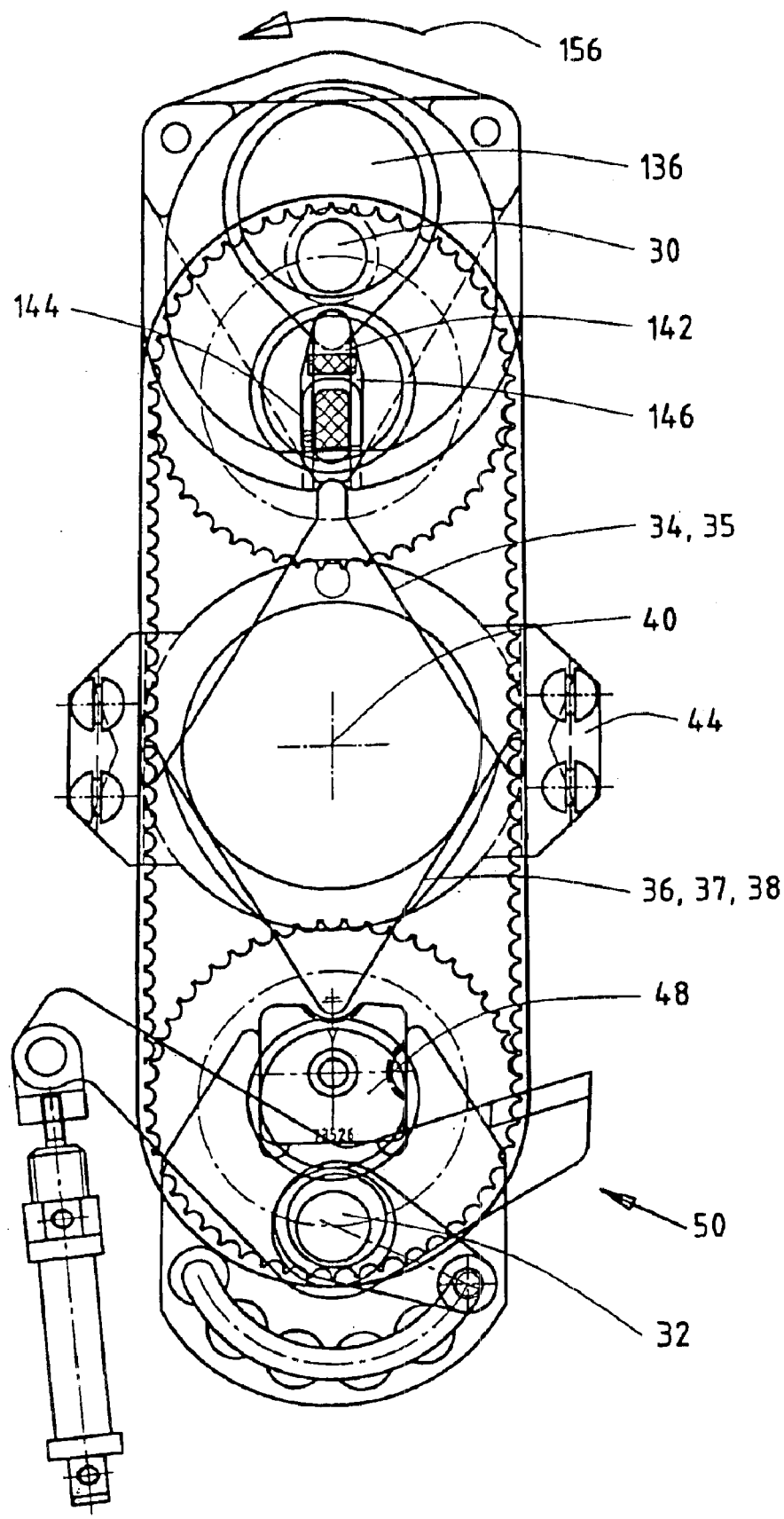
Figure 8B:
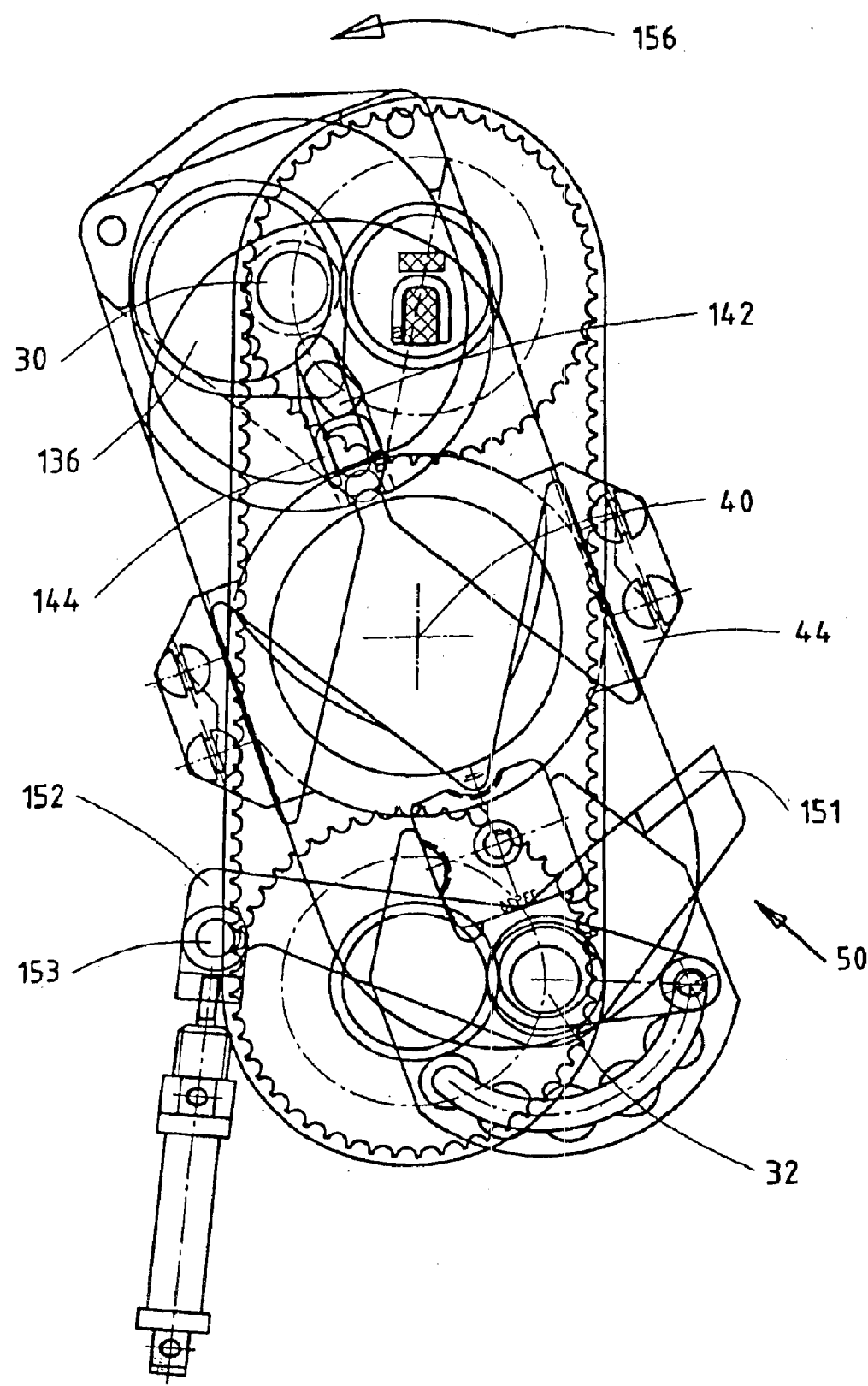
Figure 8C:
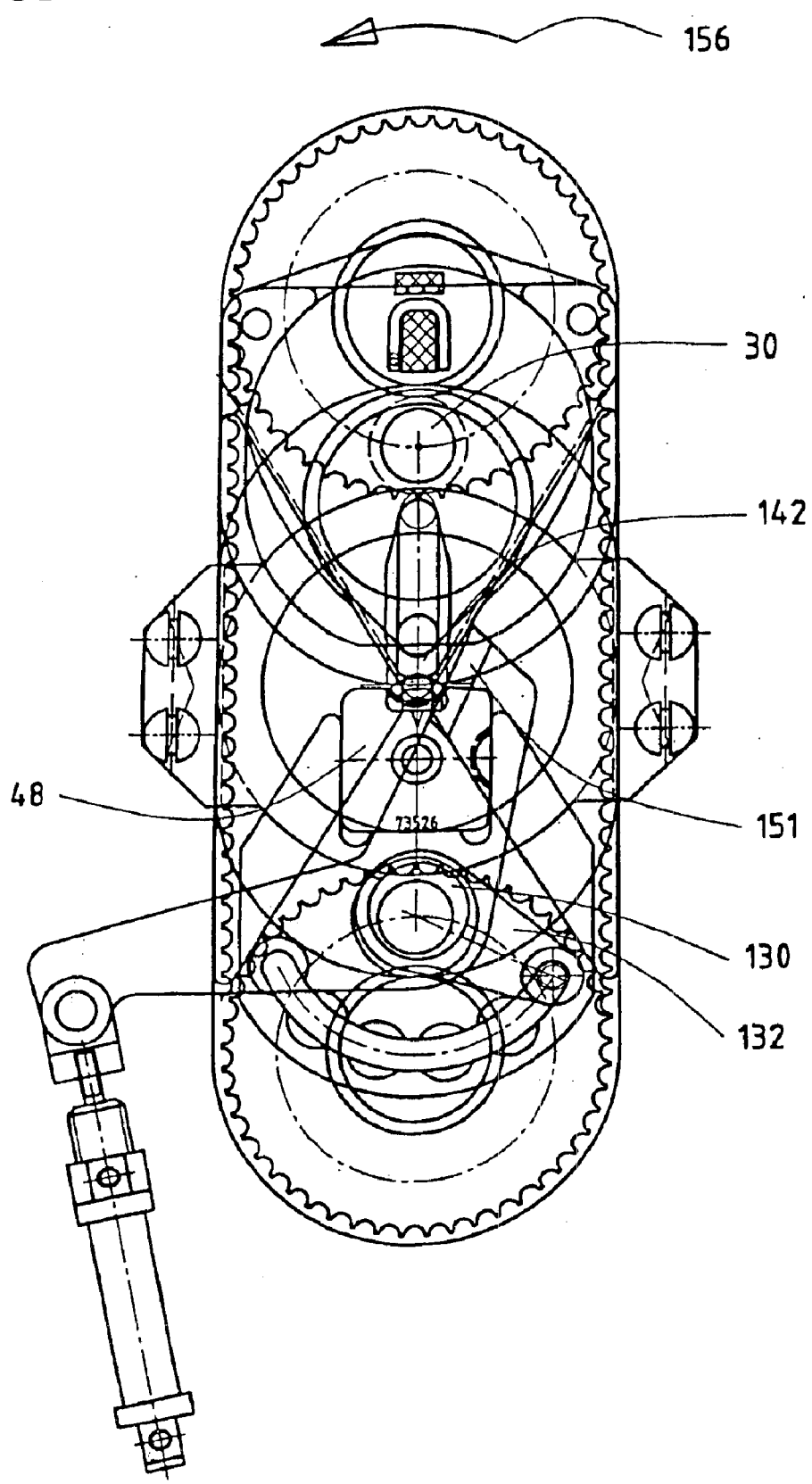
Figure 8D:
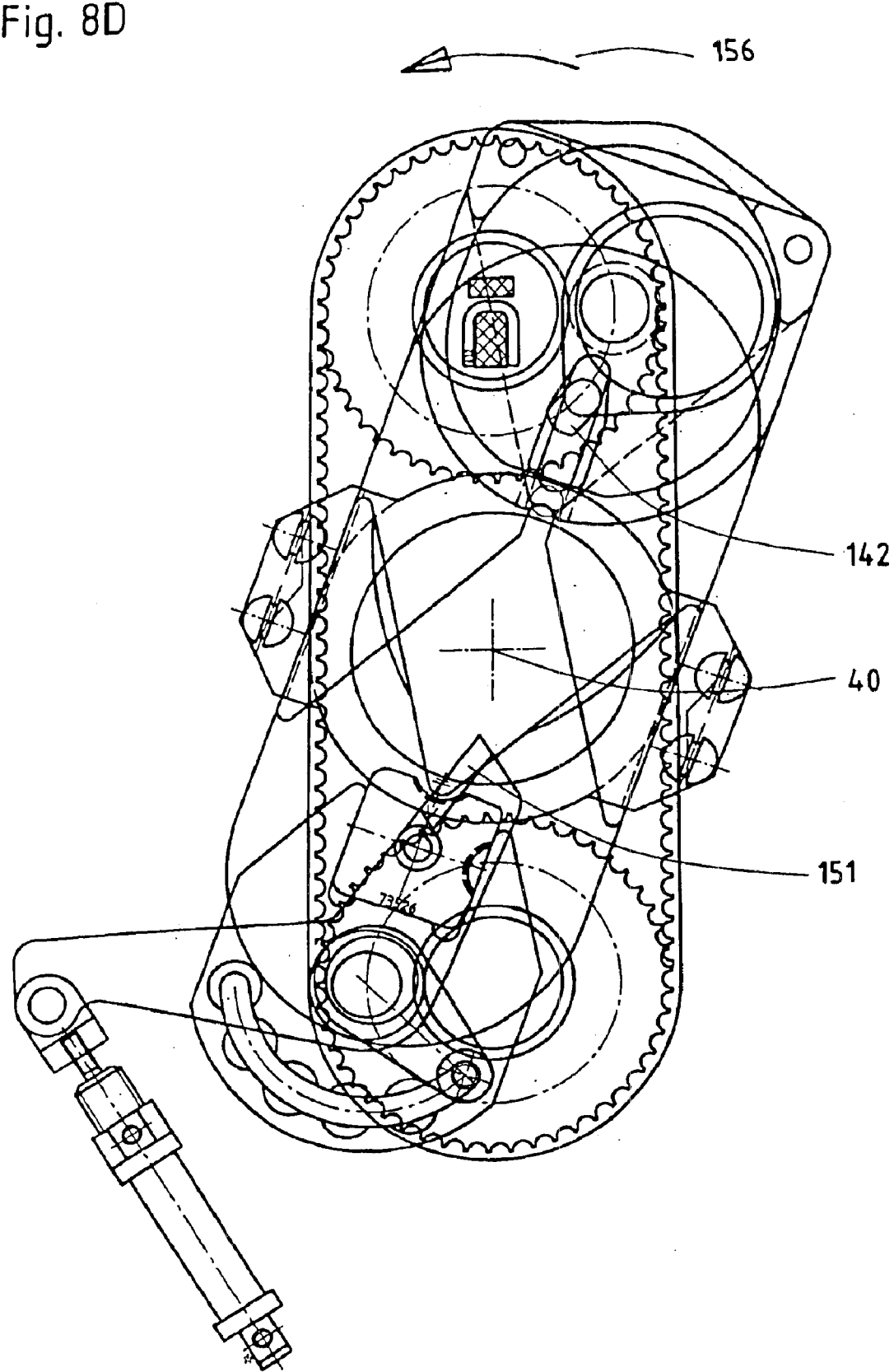

The following illustrates the invention with an example of a double clip machine based on the drawings. The figures show:

FIG. 1A the front view of the preferred embodiment of the invented portioning device in an overall view;

FIG. 1B the front view of a clip guide assigned to the portioning device from FIG. 1A (in a somewhat smaller scale);

FIG. 2A a side view of the embodiment of the portioning device in the overall view;

FIG. 2B a side view of the assigned clip guide (in a somewhat smaller scale);

FIG. 3 the front view of a carrier, depicted in isolated form, of the portioning device;

FIG. 4 the drive connection of the two cranks;

FIG. 5 a displacement element set plus adjusting device in the front view;

FIG. 6 the elements of the clipping apparatus (tappet device and matrix) taken from the drawing of FIG. 5 in a front view;

FIG. 7 a knife of the same portioning device, also in the view as FIG. 5;

FIG. 8A the portioning device in its fully opened operating position (starting position);

FIG. 8B the portioning device from FIG. 8A in a second, semi-closed operating position;

FIG. 8C the portioning device in a third, completely closed operating position;

FIG. 8D the portioning device in a fourth, semi-closed operating position.

DETAILED DESCRIPTION OF THE DRAWINGS

The embodiments shown in FIGS. 1A and 2A basically exhibits substantially a mirror symmetry to a center plane vertically intersecting the depicted plane in FIG. 2A so that in the following—to the extent that it is useful—for clarity reasons only the components of one symmetry half (and thus a simplified clip machine) are being referenced.

The portioning device 1 has a fixed carrier 10, e.g. mounted on a stand that is not depicted. In the carrier, an upper and a lower hollow shaft 16, 18 are displaceably mounted about an upper and a lower axis of rotation 12, 14. The hollow shafts 16, 18 are single-sidedly seated for this purpose on their one axial end in ball bearings 20, 22. On their other axial end, they carry a pulley 24, 26, respectively. The two pulleys 24, 26 can be interlocked through a toothed belt 28 and can thus be put into a synchronous rotational movement by their joint drive (not shown) (FIG. 4).

The pulleys 24, 26 each are connected with a counter-part that is arranged mirror-symmetrical to the center plane via an eccentrically arranged crank pin 30, 32, forming a first and a second crank respectively. On the crank pins 30, 32 several, axially spaced, parallel upper displacement elements 34, 35 and lower displacement elements 36, 37, 38 are arranged. All displacement elements have a basically triangular or V-shaped notch on their free ends. The upper displacement elements face the upward facing notch of the lower displacement elements with their downward facing notch. In the open position of the displacement elements shown in FIG. 1A, the notches thus form a rhombic opening that is arranged symmetrically about a (virtual) casing or central axis 40. The opening is large enough to allow the filled tubular casing 42, e.g. with a sausage, to pass.

On their parallel, straight outer edges the displacement elements are guided in a guiding element 44, which is seated on the carrier 10, in the longitudinal direction so as to pivot in a manner about the casing axis 40 (FIG. 3). The upper and lower displacement elements thus perform a substantially linear mutually opposite relative movement in the area of the casing axis. In doing so, they interact as sets in an overlapping manner in such a way that they—in the ideal case touch-lessly—constrict the cross-section of the casing and thus axially displace the stuffing material from the appropriate section of the tubular casing.

In the axial gaps between the displacement elements 34, 35 and 36, 37 arranged on a crank pin 30, 32, respectively, spacers 120, 123, which are displaceably connected to the crank pins and are connected with the displacement elements, as well as elements of the clipping apparatus are located. The latter are a tappet device 46 on the upper crank pin 30 and a matrix 48 on the lower crank pin 32 in the present example. The movement of the tappet device 46 and the matrix 48 is thus coupled with the movement of the upper and lower displacement elements (FIGS. 5 and 6).

On the side of the inner displacement element set 35, 37 facing the center plane, an additional displacement element 38 is seated on the lower crank pin 32. This restricts the gap around the center plane such that a knife 50, which is arranged centrically in the center plane, is guided laterally between this displacement element 38 and its mirror-symmetrically arranged counter-part. The position of the tubular casing 42 or of the casing tress that is formed is thus so exactly defined when closing the displacement elements that the latter can be severed safely with the knife 50 (FIG. 7).

Pursuant to FIG. 2A the portioning device with its casing axis 40 is arranged coaxially to the joining area of an immediately adjacent filling pipe 52. When filling the casing 42, which is closed on one side with the closing element 54, a casing supply 56 that is slid onto the outer circumference of the filling pipe 52 is pulled off by the stuffing material inserted at pressure. A brake 58 prevents in the familiar fashion the uncontrolled sliding of the casing supply 56 from the filling pipe 52.

A clip intake channel 60, 62 protrudes into the upper hollow shaft 16—also symmetrical to the center plane on both sides, wherein one of the channels is depicted in a laterally pivoted position—for example for the purpose of cleaning or performing maintenance work on the portioning device—see FIG. 2A. When the clip intake channel 60, as depicted in the right symmetry half of the embodiment, is in a position that is ready for operation, this channel joins in a clip guide path 146, as described in detail below under FIG. 6. Clips 66, which are arranged along the strand and can be detached from each other, are held on a magazine rod 68 of the clip intake channel 60. The magazine rod 68 runs in a 90° arch from the top into the horizontal, wherein the clips 66 follow automatically in the direction of the clip guide path 146 due to their inherent weight and gravity.

In addition to gravity, a mechanical clip advancing device 70 is provided in the shown embodiment. The clip advancing device 70 consists of a set of forwarding rollers 72, 74 arranged on both sides of the magazine rod 68, with these rollers being seated on an axis 78, 80 that is suspended in a pivoting manner about a centrically arranged swivel axis 76. The drive of the advancing rollers occurs intermittently by a rocking movement of the axle suspension 82, wherein the rollers have free space, which permits only a direction of rotation with opposite orientation for both rollers, i.e. downward in the area between the rollers. This way a roller can roll off during the swiveling upward movement along the clip strand, while the second roller simultaneously is hindered in performing a rotation during its swiveling downward movement and conveys the clip strand downward through an interlocking carry-along movement. The rollers 72, 74 engaging on each clip strand 66 in sets are pressed against the clip strand 66 via a tension spring connecting the two axes 78, 80. This way, the clip strand is practically not pressed against the magazine rod 68 and friction is minimized. The drive for the rocking movement of the axle suspension 82 is derived from the guiding element 44 swiveling during operation via a lever arm 84 that is connected to a pin 86 (FIG. 3).

The clip strand 66 is pulled from a spool supply 88, see FIGS. 1B, 2B. The coaxially suspended spool pair 88 is arranged in such a way that the center of each spool 88 is positioned in the axial direction basically above the end of the assigned magazine rod 68 so that the clip strand 66 can be unwound from the spool 88 without any larger lateral pivoting. In the symmetrical double configuration shown in FIGS. 1B and 2B with two spools rotating in mutually opposite directions this is accomplished by rotating the two spools 88, 90 about a small angle diagonally to the central axis 40. Another solution provides for the two spools to be positioned on vertically and/or horizontally offset axes centrically above the respectively assigned magazine rod 68. The disadvantage here however would be the larger need for space.

The carrier 10 is shown again in FIG. 3 in an isolated front view. It contains basically three large bores 92, 94, 96, which are arranged in a collinear fashion along its main direction of extension, wherein the center bore 96 of these bores is centered to the casing or central axis 40. Concentric to the center bore 96, a ring segment 98 is incorporated on the outer contour of the carrier. On the ring segment the guide element 44 is seated so as to be able to swivel and glide about the central axis 40. The dotted arched lines 102, 103 complete the ring segment 98, which in this view is not visible. The dotted straight lines 105, 106 represented in this view also not visible guide grooves that are allocated to the guide element 44 for the displacement elements 34, 35, 36, 37, 38. The stroke from the swiveling or oscillating movement of the guide element 44 is limited to an angle section, which is determined by the sections of the ring segment 98 generated by four clearances 100 as well as the width of the guide element 44.

On the front, i.e. the side facing the observer, the pin 86 for the drive of the clip advancing device 70 is arranged on a ring 99 covering the ring segment 98. It swings about the central axis 40 during movement of the guide elements 44, wherein its arrangement is adjusted to the position of the coupling point of the lever arm 84 on the clip advancing device 70.

The bores 92, 94 located above and below symmetrically to the central axis 40 in the carrier 10 serve the seating of the ball bearings 20, 22. Within the bores 92, 94, dot-point lines 116, 118 are shown, which represent the peripheral travel circles of the crank pin 30, 32 during an operating cycle. Furthermore the carrier 10 has three additional bores on its lower end, of which the two outer bores serve the seating of screws 108. With the screws 108, the two carriers 10 are connected via a spacer 110 symmetrically to the center plane and at a distance from each other (FIG. 2A). Furthermore, a one-sided extension arm 112, on whose free end in another bore 113 an axis is seated to which a pneumatic cylinder 114 is connected in such a way that its piston 154 engages with the knife 40 as an adjusting device, is mounted to the carrier 10 (see FIG. 7).

FIG. 4 clarifies again how the upper and lower pulleys 24, 26 are connected in an interlocking manner via a toothed belt 28. When the lower hollow shaft 14 for example is rotated via an electric rotational drive or via a hand crank, torque is transmitted synchronously and without slippage also to the upper hollow shaft 16. The configuration of the crank pins 30, 32 is selected such that they move towards and away from each other in mutually opposite directions. The crank pins 30, 32 are arranged in a point-symmetrical way in relation to the central axis 40 in each operating position. This way the forces applied to the elements arranged on them substantially compensate each other, causing the entire configuration of the positioning device to operate substantially without vibration. The position of the crank pin 30, 32 shown in FIG. 4 on the peripheral circle 116 or 118 has been maintained in the following figures.

In the front view pursuant to FIG. 5, one of the displacement elements 34, 36 is shown. Due to the angle excursion of the crank pins on one hand and the centric positioning of the guide element 44, which is not shown, on the other hand, the displacement elements are pivoted out of the vertical in FIG. 1. FIG. 5 furthermore depicts the contours of the spacers 120, 123, which are arranged, respectively, between two axially adjacent displacement elements on one of the crank pins 30, 32 in order to keep them parallel and at a defined distance. The displacement elements that are allocated to one crank pin, respectively, thus form a stack alternately with the spacers, wherein the displacement elements and the spacers are connected with each other on each of the crank pins for example via a screw in such a way that they cannot rotate against each other on the assigned crank pins.

The upper spacer 120 contains an elongated hole 124 pointing in the direction of the V-shaped notch of the allocated displacement element, wherein this hole serves in the way described further below to guide the tappet device 46. The lower spacer 123 contains on its side facing the central axis a pocket 125, which serves the seating of the matrix 48 (depicted in FIG. 6). On the side opposite the assigned crank pin 32, the lower spacer 123 contains a protrusion extending beyond the lower end of the displacement element 36, wherein this protrusion is equipped with an elongated hole 126 that is arranged in a circular segment shape around the center axis of the allocated crank pin 32 and with appropriate recesses 128 arranged along the corresponding partial circle. Between the lower crank pin 32 on one hand and the lower stack of displacement elements and spacers on the other hand, an eccentric bushing 130 is inserted, with the help of which the effective radius of the corresponding crank can be modified. To accomplish this, a lever 132 that is molded onto one end of the eccentric bushing 130 is swiveled around the crank pin 32 and thus the position of the eccentric bushing 130 modified such that the stack of displacement elements and spacers experiences a displacement relative to the crank pin 32 mainly in the direction of the casing axis. With this adjusting device, the minimal distance between the upper and lower displacement elements as well as the allocated elements of the clipping apparatus (tappet device and matrix) can be reduced or enlarged, as needed, in the casing axis adjacent closure position. The desired adjustment can occur by closing the pin removed end of the lever 132 in one of the recesses 128 for example through a screw.

FIG. 6 shows the elements of the clipping apparatus (tappet device and matrix)—again in the same operating position. The orientation of the matrix 48 is specified by the pocket 125 of the spacer 123 (FIG. 5), which is not shown here. On its side facing the casing axis, the matrix 48 contains a stamping contour 134.

On the upper crank pin 30, an eccentric disk 136 is fastened or molded on in such a way that the eccentric disk always points radially outward during the revolution, viewed from the center of the crank. On the eccentric disk 136 a pivoting ring 138 is arranged, which holds a cross rail 140 guided along the elongated hole 124 on its side facing the casing axis 40. The embodiment of a portioning device shown here is designed with its mirror-symmetrical arrangement of the components about the center plane for the simultaneous placement of two clips. In this embodiment, the eccentric disk 136 is arranged centrically on the crank pin 30, i.e. in the center plane between the displacement element double sets that are arranged symmetrically, see FIG. 2A. The cross rail 140 is designed as a rod extending symmetrically laterally in both directions from the center plane, wherein one tappet device 142 is arranged on both ends, respectively.

The upper spacer 120 consists of two stacked elements, i.e. a base washer 121 and a spacer ring 122. The height of both elements is selected such that a clip guide 146, which is incorporated in the base washer 121 and is arranged parallel and symmetrical to the elongated hole 124, is positioned in the center of the gap between the displacement elements 34, 35 adjoining the spacer 120.

FIG. 7 shows the configuration and/or seating of the knife 50 on the lower crank pin 32 in the operating position we know already from FIGS. 4–6, in an isolated view. The knife 50 basically consists of a double lever bent at an obtuse angle, which is seated on the crank pin 32 in its bent area 148 and whose one arm 150 includes a blade 151, while its other arm 152 is fastened in a stationary manner on the carrier 10 (not shown) via the pneumatic cylinder 114. When the piston 154 of the pneumatic cylinder 114 that is connected to a joint 153 is swiveled, the knife 50 swivels about the crank pin 32 until the blade 151 has been swiveled downward out of the casing axis adjacent area such that it does not cross over the central axis 40 when performing an operating cycle. This adjustment is selected when the production of a series of connecting sausages is planned. If the series of sausages is supposed to be severed, the piston 154 of the pneumatic cylinder 114 can be retracted for example for a single operating cycle so that the knife 150 during this operating cycle cuts the casing tress (not shown) with its blade 151 via a pulling cut (cutting position). In the next operating cycle, the knife can be selected to be moved again in the non-cutting position or it can remain in the cutting position so that either another series of sausages is formed or selectively individual sausages can be produced.

In the following FIGS. 8A–8D, a sequence of four operating positions is shown, based on which a full operating cycle of the invented portioning device is described. The first operating position in FIG. 8A shows the two crank pins 30, 32 as well as all elements of the portioning device seated thereon in a casing axis removed opening position. In this position, the triangular notches of the displacement elements 34–38 have the maximum, rectangular opening. The matrix 48, the knife 50 and the tappet device 142 are also located at the largest possible distance from the casing axis 40. The stacks of displacement elements, closing clips and spacers is not pivoted out in this operating position, thus causing the guide element 44 to extend vertically to the longitudinal axis of the carrier 10 (not shown in FIG. 8).

The clip guide 146, which is incorporated in the upper spacer 120, also runs in the direction of the carrier's longitudinal axis. It is also located in a position that takes on the largest possible distance to the casing axis 40. It is only in this position that the outlet opening of the clip intake channel, not shown here, or more precisely the open lower end of the magazine rod 68, aligns with the guide path of the clip 146 so that a clip strand 66 following via the clip advancing device 70 moves into the guide path of the clip. The depth of the clip guide path 146 is dimensioned such that exactly one clip finds room to end flush with the outer surface of the base washer 121 facing the clip strand. When the upper crank is driven only counterclockwise 146 so that the stack of the upper displacement elements 34, 35 and the allocated spacers in the shown position pivots laterally, the clip 144 that is introduced into the clip guide 146 is sheared off laterally from the strand of the following clip 66, see FIGS. 2A and 8B. At the same time, the outer surface of the base washer 121 facing the clip strand closes the open lower end of the magazine rod 68 and thus the outlet opening of the clip intake channel 60.

Meanwhile the eccentric disk 136 moves on a larger circumferential radius than the crank pin 30 in the direction of the casing axis adjacent closure position of the device. The tappet device 142 thus travels a larger path than the assigned displacement elements 34, 35 and the spacer 120. In doing so, the cross rail 140 moves in the groove 124 relative to the displacement elements (downward) towards the casing axis. During the downward movement, the tappet device 142 moves the severed clip 144 in the guide path 146 relative to the upper displacement elements downward in the direction of the casing axis 40.

The upper stacks of displacement elements 34, 35 and allocated spacers 120 follow on their upper end the circular path of the crank pin 30. On their lower, casing axis removed end they perform a rotating movement about the casing axis due to the swivel seating of the linear guide element 44 and simultaneously move in the radial direction towards the casing axis 40. Similarly, the lower stacks consisting of the lower displacement elements 36–38 and the allocated spacers 122 pivot on their lower end to the right on a circular path via the crank pin 32 and simultaneously move in the radial direction also towards the casing axis 40, in mutually opposite directions. The entire configuration forms a double pendulum so-to-speak, which moves counterclockwise in this phase of the operating cycle (FIG. 8B).

During this process, the knife 50 performs an additional swivel movement about the lower crank pin 32 since the connecting point 153 to the arm 152 opposite the blade 151 is guided on a circular path with constant radius in relation to the stationary carrier 10, which is not shown here. The piston 154 of the pneumatic cylinder 114 is retraced, causing the knife 50 to assume the cutting position.

In the third operating position, FIG. 8C, both crank pins have crossed an angle of 180° so that now the entire arrangement is in the casing axis adjacent closure position. In this operating position, the stacks are located again in a non-laterally pivoted position. The interacting displacement element sets overlap in this position so far that in the area of the casing axis only a minimal opening remains. The opening can be adjusted to the necessary dimension in the previously described manner via the lever 132 and the incorporated eccentric bushing 130.

The lower spacer 123 and the matrix 48 seated therein are also moved to the casing axis to a minimal distance. The tappet device 46 seated on the upper crank pin 30 is now also in the casing axis adjacent position and has approached the matrix 48 so much that the legs of the clip 144 are bent inward in the stamping contour 134 of the matrix 48. The clip 144 now forms a firm closure around the tress-like folded tubular casing.

The embodiment of a double clip machine shown in the drawings, as mentioned above, includes a double configuration of the components seated on the crank pins that is substantially mirror-symmetrical to the center plane—which penetrates the axes of rotation 12, 14 vertically. The second displacement element set and the second clipping apparatuses cause—as has been already partially described—a second clip to be attached simultaneously to the casing string at an axial distance to the first clip shown.

The knife 50 arranged in the center plane has moved with its blade 151 into the vicinity of the casing axis 40 in this operation position. Due to the geometry of the two arms 150, 152 as well as the connecting points, the blade 151 has not yet passed over the casing axis 40 at this time so that when placing the two clips the casing tress is not severed. This occurs only a brief moment after placing the clips to ensure that no stuffing material can leave the tubular casing 42 during the cutting process.

In the fourth operating position, FIG. 8D, the double pendulum swings to the other side. The elements seated on the crank pins swing on their casing axis removed end to the other direction in a circular motion, while the constricting device formed by the interacting displacement elements 34–38 moves outward in the radial direction, i.e. opens. At the same time, the tappet device 46 moves upward relative to the upper displacement elements 34, 35 in its longitudinal guidance 124. In this position, the knife 50 has already passed over the casing axis 40 with its blade 151 in a pulling cutting movement and now pivots again out of the triangular opening of the lower displacement elements 36–38.

Further advantages of the invented portioning device are caused by its compact design and its low-vibration course. For example it is feasible to flange the portioning device directly (quasi in a modular fashion) onto a filling machine arranged in front of it. The drive module and the control system for the filler can also be used to generate a rotating movement of the portioning device. For example a continuous rotating drive can be derived from the servo drive of the filler. Furthermore, depending on the desired fill quantity, the speed of the drive can be varied as a function of the opening position of the displacement elements. For example it is possible to program the control of the filler and/or of the drive of the portioning device in the case of a large fill quantity such that the speed in the area of the opening position is lower than during the remaining operating cycle. Furthermore a beneficial feature is the lower drive performance caused by the low masses and the harmonic course of the operations.

I claim:

1. A device for partitioning portion packages of filling material in a flexible tubular casing by constricting a portion of a filled casing and displacing filling material from the constricted portion of the casing to form a tress of said constricted portion of said casing and applying at least one closing clip onto said casing tress, the device comprising:

a guide element pivotable about a central axis of said tubular casing;

two sets of displacement elements, each set comprising at least one first displacement element and one second displacement element, which are displaceable in mutually opposite directions in an overlapping and symmetrical manner with respect to said central axis and which comprise substantially triangular notches facing each other, wherein at least a portion of each displacement element is positioned within said guide element and said displacement elements are moveable linearly along a guide portion of said guide element, a clipping apparatus comprising two interacting elements which are displaceable between the sets of displacement elements in mutually opposite directions and coupled to the movement of the displacement elements, a first crank pin comprising a crank pin positioned on the first crank at a distance defining a first radius and a second crank pin comprising a crank pin positioned on the second crank at a distance defining a second radius, the radii of said first and second crank pins being equal to each other, and their axes of rotation and the central axis being parallel and coplanar, and wherein the cranks are driven in the same direction as each other;

wherein the first crank pin of the first crank is pivotally connected with the first displacement element of each set of displacement elements to move the first displacement elements as well as a first element of said two interacting elements of the clipping apparatus and wherein the second crank pin of the second crank is pivotally connected with the second displacement element of each set of displacement elements to move the second displacement elements as well as a second element of said two interacting elements of the clipping apparatus, wherein said first and second cranks are rotatable about their axes of rotation synchronously to close or open said displacement elements about said central axis and to move said elements of said clipping apparatus towards or away from each other, wherein the rotation of the cranks cause the displacement elements, the clipping apparatus, and the common guide element to pivot about said central axis.

2. The device according to claim 1, wherein the first and second interacting elements of the clipping apparatus comprise a stamp, a matrix for closing a clip, and wherein a clip intake channel meets a guide path at a distance from the first crank pin pivotable connecting said clipping apparatus to said first crank in such a way that its outlet opening is aligned with the guide path only in an opening position of said clipping apparatus and that a clip can enter said guide path.

3. The device according to claim 2, wherein the stamp of the clipping apparatus is seated eccentrically on said first crank pin, in a pivoting manner, in such a way that during the first crank rotation from an open position of said clipping apparatus to a closing position of said clipping apparatus the stamp travels a larger path than the displacement element assigned to the first crank.

4. The device according to claim 3, wherein an eccentric disk fastened onto said first crank pin seats the stamp and movement of the stamp is guided in a guideway.

5. The device according to claim 4, wherein said clipping apparatus comprises two sets of stamps, and wherein the eccentric disk is assigned to both stamps by incorporating a ring which is pivotable about said disk and which supports a cross rail, the cross rail being guided in both stamp guideways and incorporating a stamp on each of the rail's two ends.

6. The device according to claim 5, further comprising a knife guided in a center plane which is selectively includable in an operating cycle of said device in order to cut through the casing tress between two closing clips.

7. The device according to claim 6, wherein said knife comprises a blade and the blade of the knive is incorporated on a free end of a flat lever, said lever having another end which is pivotable on said second crank pin of said second crank.

8. The device according to claim 7, wherein the lever is a double lever bent at an obtuse angle, which in its bent area is seated on said second crank pin and whose one arm is designed as blade, while its other arm is fastened to a carrier in a stationary manner via an adjusting device whose length can be modified.

9. The device according to claim 2, wherein the clip intake channel protrudes to the guide path of the clip through the axis of rotation of the first crank moving the stamp.

10. The device according to claim 9, wherein the clip intake channel can pivot laterally.

11. The device according to claim 1, wherein the minimal distance between the first displacement element and the central axis or the minimal distance between one of the interacting elements of the clipping apparatus assigned to the first crank and the central axis, or both distances, are adjustable.

12. The device according to claim 11, wherein an eccentric bushing, which is inserted between the second displacement element and said second crank pin, or between one of the interacting elements of the clipping apparatus assigned to the first crank and said pin, or between both and said pin, changes the effective radius of the affected crank.

13. The device according to claim 12, wherein the eccentric bushing is fastened on one end of a lever which is swivelable about said second crank pin, wherein a second end of the lever can be fastened within a predetermined angle range in relation to the second displacement elements, the second interacting element of the clipping apparatus, or both.

14. The device pursuant to claim 1, wherein two sets of displacement elements and two clipping apparatuses are arranged next to each other and symmetrically to a center plane penetrating the axes of rotation of the cranks, with which two closing clips can be placed at a distance from each other onto the casing tress.

15. The device according to claim 1, wherein a continuous rotating device impacts a first pulley, which carries the one crank pin and is pivotable about a first axis of rotation, and via a toothed belt also a second pulley, which carries the second crank pin and which can pivot about a second axis of rotation.

16. The device according to claim 15, wherein the speed of the rotating device is variable during an operating cycle of said device.

* * * * *